United States Patent

Heitzer

[11] Patent Number: 5,975,136
[45] Date of Patent: Nov. 2, 1999

[54] TORSIONAL SENSOR FOR A POWER-ASSISTED STEERING DEVICE

[75] Inventor: Heinz-Dieter Heitzer, Heinsberg, Germany

[73] Assignee: TRW Fahrwerksysteme GmbH & Co. KG, Dusseldorf, Germany

[21] Appl. No.: 09/029,439

[22] PCT Filed: Sep. 4, 1996

[86] PCT No.: PCT/EP96/03876

§ 371 Date: Mar. 5, 1998

§ 102(e) Date: Mar. 5, 1998

[87] PCT Pub. No.: WO97/09221

PCT Pub. Date: Mar. 13, 1997

[30] Foreign Application Priority Data

Sep. 8, 1995 [DE] Germany .......................... 195 33 152

[51] Int. Cl.[6] .................................................. F15B 9/10
[52] U.S. Cl. .................... 137/625.21; 91/375 R; 91/375 A
[58] Field of Search .............. 91/375 R, 375 A; 137/625.23, 625.21

[56] References Cited

U.S. PATENT DOCUMENTS 5,103,715   4/1992   Phillips .
5,307,892   5/1994   Phillips .

FOREIGN PATENT DOCUMENTS 0575634   12/1993   European Pat. Off. .
2758321   7/1978    Germany .
2734182   2/1979    Germany .
2001767   2/1979    United Kingdom .................. 91/375 R

OTHER PUBLICATIONS

"Freqeunzanaloge Drehmomentmessung mit Oberflachen-wellen–Resonatoren", ™Technisches Messen, 58 (1991) Sep., No. 9, Munchen, DE, pp. 329–334.

*Primary Examiner*—Gerald A. Michalsky
*Attorney, Agent, or Firm*—Tarolli, Sunheim, Covell Tummino & Szabo

[57] ABSTRACT

A steering mechanism has an input shaft 2, a steering valve 1, an output shaft 3, and a torsionally elastic element 5. The input shaft 2 has a first longitudinal axis about which the input shaft 2 is rotatable, the input shaft 2 being rotatable about the first longitudinal axis to effect the steering of a vehicle. An end of the input shaft 2 is located in the steering valve 1. The output shaft 3 has a second longitudinal axis coaxial with the first longitudinal axis and a first end adjacent the end of the input shaft 2. The torsionally elastic element 5 flexibly connects the first end of the output shaft 3 and the end of the input shaft 2 such that the input 2 and output 3 shafts are able to rotate relative to each other about the first and the second longitudinal axes, respectively, during vehicle steering. The torsionally elastic element 5 includes a plurality of separately arranged strips 8, 9, 10 & 11 located in the steering valve 1. The plurality of separately arranged strips 8, 9, 10 & 11 have longitudinal axes and are adapted to twist during vehicle steering.

11 Claims, 3 Drawing Sheets

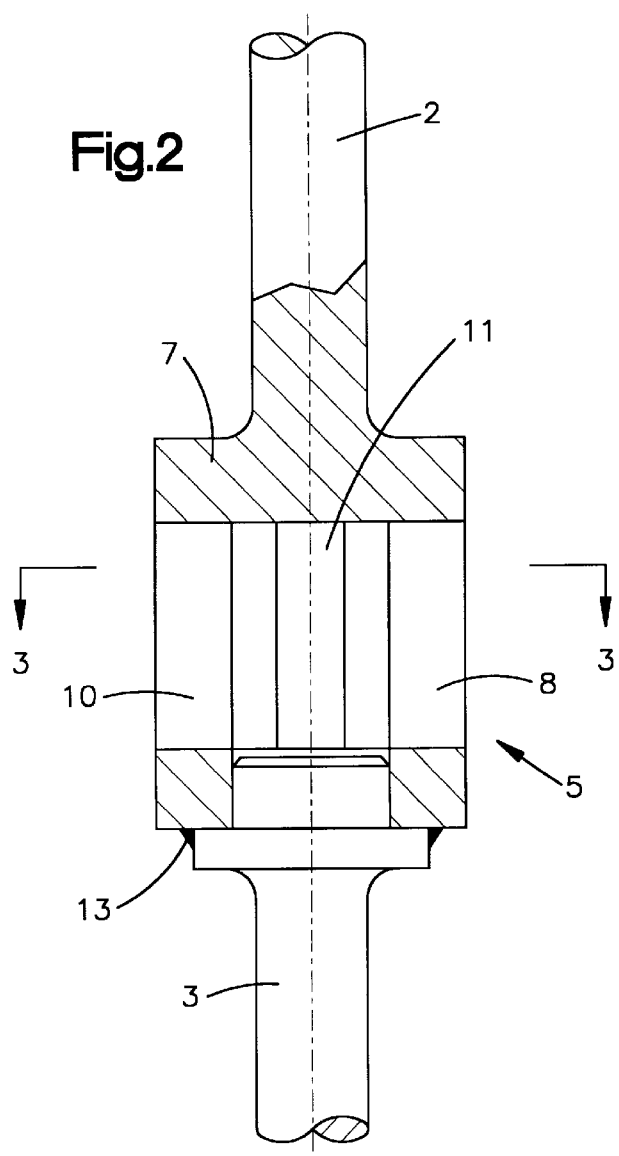
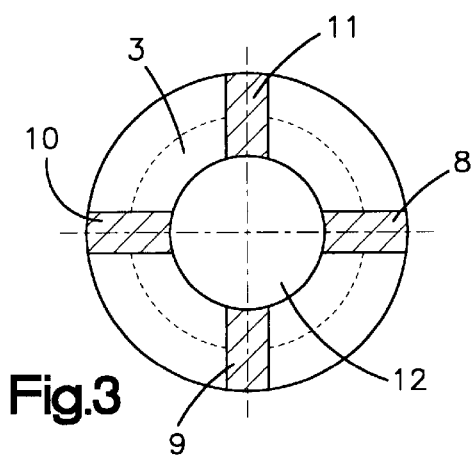
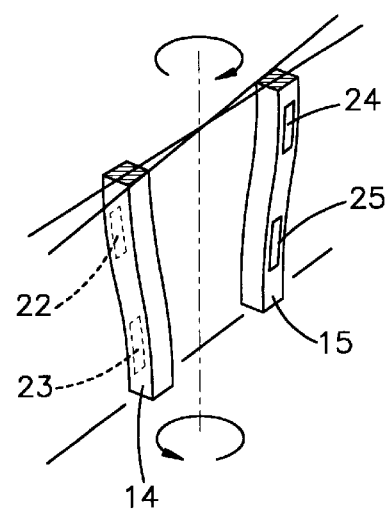

TORSIONAL SENSOR FOR A POWER-ASSISTED STEERING DEVICE

The invention relates to a steering valve with an input shaft, an output shaft and a torsionally elastic element connected at one end to the input shaft and at the other end to the output shaft.

Steering valves, particularly so-called rotary disk type valves, are used by preference in power-assisted steering systems. Here, for example, hydraulic control means are used to shift hydraulic steering bores relative to each other as a function of the relative torsion between input and output shaft, which in turn depends on the spring characteristic of the torsionally elastic element, such that hydraulic fluid flow occurs. Other control types are conceivable.

In order to be able to use such systems in a defined controlled manner, a wide variety of measures are taken to detect signals by means of sensors. However, in practice, no direct measured values are generated but only indirect functional variables based on which the respective desired value can be determined. It is desirable, for example, to generate steering torque dependent electrical signals and use these for steering control. For this purpose, the steering torque can be converted into a measurable relative motion of two components by means of a torsion element of a steering device of the generic class or the strain can be measured directly on the surface of the torsion element. Various inexpensive methods for measuring strain with great accuracy are known. However, their use for measuring steering torques is problematic because the steering shaft (input shaft) is not only subject to torsion but also to bending and in a conventional torsion element with a round cross-section, the surface tensions due to bending moments compared to the surface tensions due to torsional moments are too small.

Mechanical decoupling of the two stress types, for example by means of a multiple bearing arrangement of the steering shaft or a guide bush, not only substantially increases the costs to build the steering device but, due to unavoidable bearing friction, can also lead to unacceptable hysteresis in the steering torque signal.

DE 27 34 182 A1 describes a device for measuring steering torques and steering angles in vehicles. A steering shaft and a dynamo hub that can be connected thereto are arranged in the steering wheel area to measure steering torques. An additional measuring element comprises an upper and a lower ring which are connected to each other by spokes that are arranged in fish-trap fashion and provided with strain gauges. Such an additional measuring element entails a redesign of conventional steering valves and a substantial increase in size. A torque sensor is disclosed in EP 0575634 A1.

Thus, it is the object of the present invention to further develop a steering valve of the generic class so that on the one hand steering torques result in easily measurable surface strains on a component and on the other hand bending stresses of the steering shaft (input shaft) do not appreciably influence the measuring result.

To solve this technical problem, the invention proposes that the torsionally elastic element be made of a plurality of separately arranged strips.

The solution according to the invention makes it possible that steering moments essentially result in a bending stress of the strips with easily measurable surface strains, whereas bending moments on the steering shaft (input shaft) essentially cause only tensile or compressive stresses of the strips with surface strains that are very minor by nature.

The solution according to the invention now makes it possible to evaluate the mechanical strain of at least two of the strips forming a torsion element by means of measurements and thus precisely to measure, for example, the steering torque.

The invention proposes to arrange the strips such that they extend in axial direction of the input and output shaft, respectively, and are spaced apart from each other. It is particularly advantageous if the strip arrangement is ring-shaped.

The described advantageous embodiment of the invention thus replaces a conventional torsion element by strips that are arranged in the shape of a ring; that is, the bar-shaped strip elements, which according to one proposal of the invention are advantageously rectangular or trapezoidal in cross section, are arranged in such a way that they extend along the surface of an imaginary cylinder, parallel and spaced apart from each other, and are fixed at one end to the input shaft and at the other end to the output shaft. The imaginary cylinder, for its part, is concentric to the longitudinal center axis of the unit formed by the input and the output shaft. If the input shaft is twisted with respect to the output shaft, the strip elements are uniformly stressed such that, for example, the signal representing the torque can be measured directly. The strips may be interconnected at least at one end by a ring element. Such ring element may in turn be connected to one of the two shafts.

With particular advantage, the invention proposes that each separate strip have a defined deformability so that signal measurement is significantly simplified.

To measure the signals, the invention advantageously proposes to arrange strain sensors on the strips which advantageously are strain gauges or so-called SAW sensors, that is, surface acoustic wave devices. Advantageously, the strain gauges are disposed so that they can be evaluated in a compensating manner.

Finally, the invention proposes the wireless transfer of the measured data. Alternatively, it is of course possible to use vires, for example spirally wound ribbon cables, such that relative twists cannot negatively affect the measured data transfer, or wireless transfer methods, for example, inductive methods may be used. Compensating connectability means, for example, that the sensors of opposite strips are used for measurements. This has the particular advantage that bending moments can be compensated. It is particularly advantageous if four strips are arranged at 90° intervals, respectively. The strain gauges can easily be mounted on the readily accessible side areas of the strips so that expensive sensors, for example SAW sensors, may be used cost effectively even in series production.

Finally, the invention proposes to provide overload protection to prevent destruction of the design according to the invention. For example, overload protection may consist of the fact that the input shaft and the output shaft run into each other over a given axial length, whereby the respective outer shaft has an enlarged rectangular location opening in which a rectangular end with shorter edges of the respective other shaft is inserted. Thus, starting with a specific with a specific torsion angle, the two shafts are in contact and the torque transmitting strip arrangement cannot be further stressed.

The invention provide a simple and economical steering valve making it possible to pick up steering torque signals and generally pick up electrical signals for control purposes.

Additional advantages and characteristics of the invention are described below by means of the figures.

FIG. 2 is a schematic representation of an exemplary embodiment of a torsion element.

FIG. 3 is a section along Line III—III according to FIG. 2.

FIG. 4 is a schematic representation of stressed strip elements.

Figure 1:
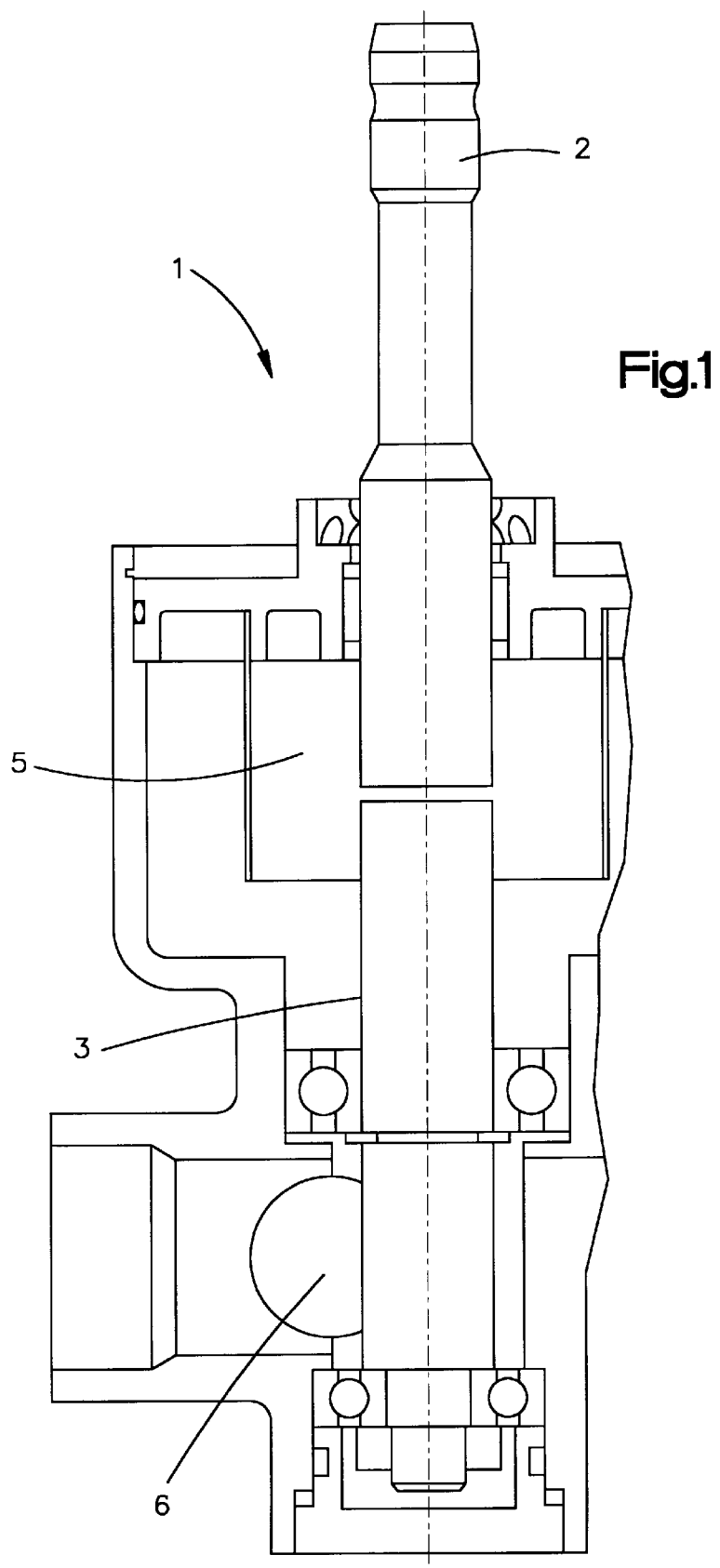
FIG. 1 is a schematic representation of a steering value.

FIG. 1 shows the schematic structure of a power-assisted steering device a steering value 1, comprising an input shaft 2 and an output shaft 3 mounted in a housing with the output shaft 3 engaged, for example, with a rack 6 of a steering gear. At the location where the input shaft and the output shaft run into each other, the input shaft 2 has a rectangular segment on its end face which projects into a rectangular recess in the output shaft 3. The rectangular recess of the output shaft 3 is enlarged with respect to the rectangular segment of the input shaft, such that the two shafts 2, 3 can be twisted with respect to each other by a predetermined angle until they come into contact. Within this twistability range, the two shafts are prestressed by a torsionally elastic element. The device described above makes it possible to generate measured values representing the steering torque by measuring the relative twist between input shaft 2 and output shaft 3. To permit the generation of measured values that represent the steering torque by measuring surface strain, a torque strip arrangement 5 is used.

FIGS. 2 and 3 show an exemplary embodiment for a torque strip arrangement 5. In the embodiment shown, input shaft 2 is provided with a disk-shaped flange 7 on its end face with which strips 8, 9, 10 and 11 form a single unit. Such strips are disposed parallel to each other along the surface of an imaginary cylinder 12, coaxially to the unit formed by input shaft 2 and output shaft 3, and are provided at their other end with an additional integral end flange to which output shaft 3 is fixed by weld seam 13. Input shaft 2 can be continued centrally or concentrically in any desired thickness and project into output shaft 3 and/or vice versa, to form an overload protection in the above described manner.

FIG. 4 schematically represents the nature of the strain of strips 14, 15 when a force is applied to a torque strip arrangement in the direction of the arrows. The input shaft is twisted clockwise against the output shaft. Strips 14 and 15 equipped with sensors 22, 23, 24 and 25 deform in the manner shown. Electrical or electronic analysis of the strain sensors, either strain gauges or SAW devices, makes it possible to measure a signal representing the torque. The fact that opposite strips are used for the measurement permits full compensation of, for example, bending moments.

As shown in plan view in FIG. 3, the strain gauges can easily be mounted on the side edges of the strips if four strips are employed because access is completely free. Thus, this arrangement is particularly suitable for industrial series production.

Figure 5:
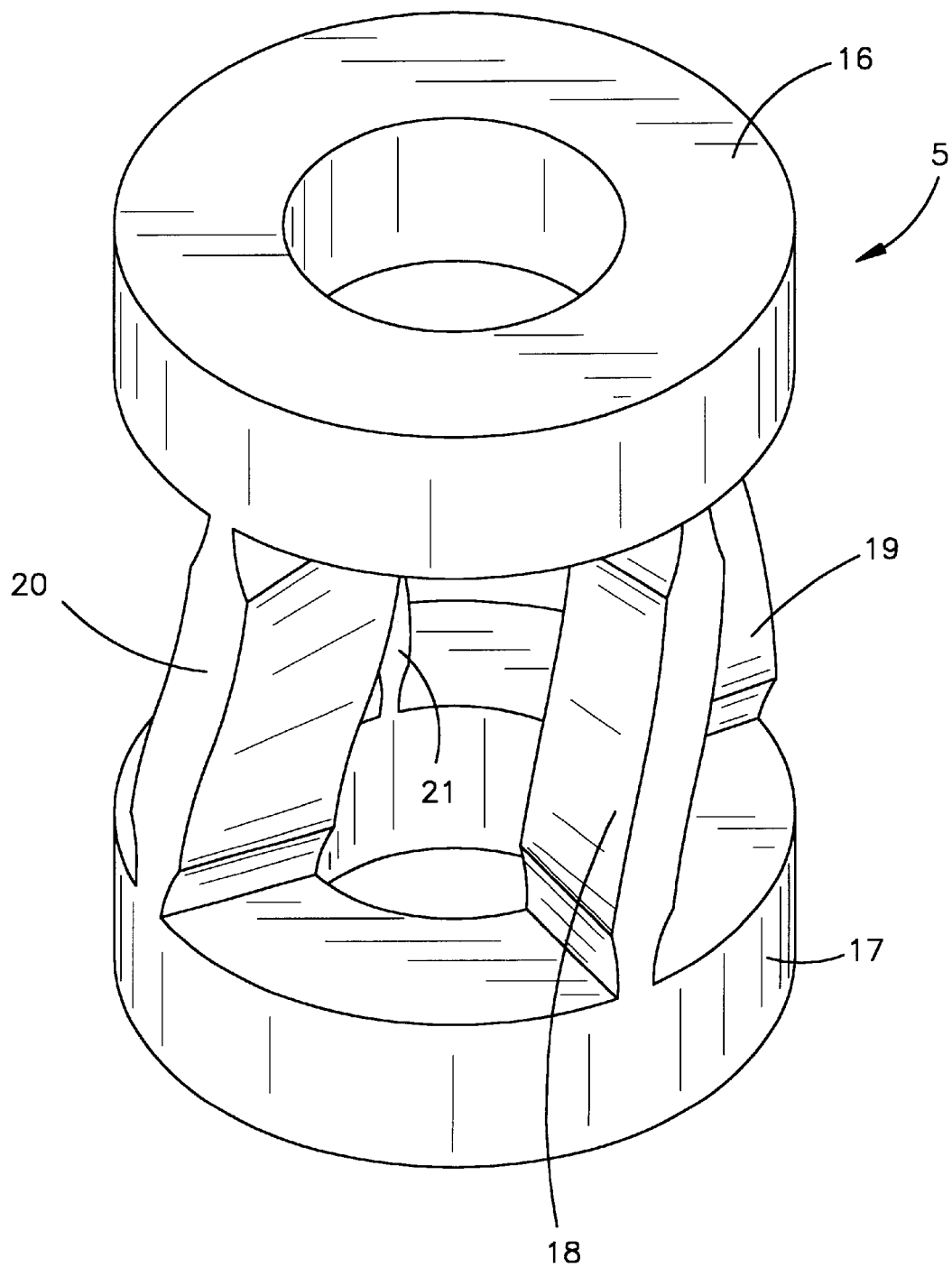
FIG. 5 is a perspective view of a stressed torsionally elastic element wherein the stress zones are screened.

FIG. 5 finally shows an exemplary embodiment of a torsion strip arrangement 5 where square bars 18, 19, 20 and 21 are inserted between two rings 16, 17. The upper ring is twisted counter-clockwise with respect to the lower ring such that the indicated strains result. The screened areas clearly show the strain centers. With the use of appropriate strain sensors, the desired measuring signals can now be easily derived.

LIST OF REFERENCE NUMBERS

1 Steering device
2 input shaft
3 output shaft
5 torque strip arrangemnent
6 rack
7 end flange
8 strip
9 strip
10 strip
11 strip
12 imaginary cylinder
13 weld seam
14 strip
15 strip
16 ring
17 ring
18 strip
19 strip
20 strip
21 strip
22 sensors
23 sensors
24 sensors
25 sensors
$\phi_{rel}$ angle

I claim:

1. A steering mechanism comprising:

an input shaft having a first longitudinal axis about which said input shaft is rotatable, said input shaft being rotatable about said first longitudinal axis to effect the steering of a vehicle;

a steering valve in which an end of said input shaft is located;

an output shaft having a second longitudinal axis coaxial with said first longitudinal axis and having a first end adjacent said end of said input shaft; and a torsionally elastic element which flexibly connects said first end of said output shaft and said end of said input shaft such that said input and output shafts are able to rotate relative to each other about said first and said second longitudinal axes, respectively, during vehicle steering;

said torsionally elastic element comprising a plurality of separately arranged torsionally elastic strips located in said steering valve, said plurality of separately arranged strips having longitudinal axes and being adapted to twist during vehicle steering.

2. The steering mechanism of claim 1 wherein said longitudinal axes of said strips extend in a direction parallel to said longitudinal axes of said input and said output shafts.

3. The steering mechanism of claim 2 wherein said strips are joined by at least one ring element.

4. The steering mechanism of claim 1 wherein said strips are circumferentially spaced about said longitudinal axes of said input and said output shafts.

5. The steering mechanism of claim 1 wherein said strips have a rectangular cross section taken through a plane perpendicular to said longitudinal axes of said strips.

6. The steering mechanism of claim 1 wherein said strips have a trapezoidal cross section taken through a plane perpendicular to said longitudinal axes of said strips.

7. The steering mechanism of claim 1 wherein a second end of said output shaft is engaged with a rack of a steering gear.

8. The steering mechanism of claim 1 wherein said strips are equipped with sensors.

9. The steering mechanism of claim 8 wherein said sensors are strain gauges.

10. The steering mechanism of claim 8 wherein said sensors are SAW sensors.

11. The steering mechanism of claim 8 wherein said sensors comprise compensating sensors.

* * * * *